J. N. VANDEGRIFT.
CAR WHEEL.
APPLICATION FILED DEC. 27, 1910.
1,071,000.
Patented Aug. 19, 1913.
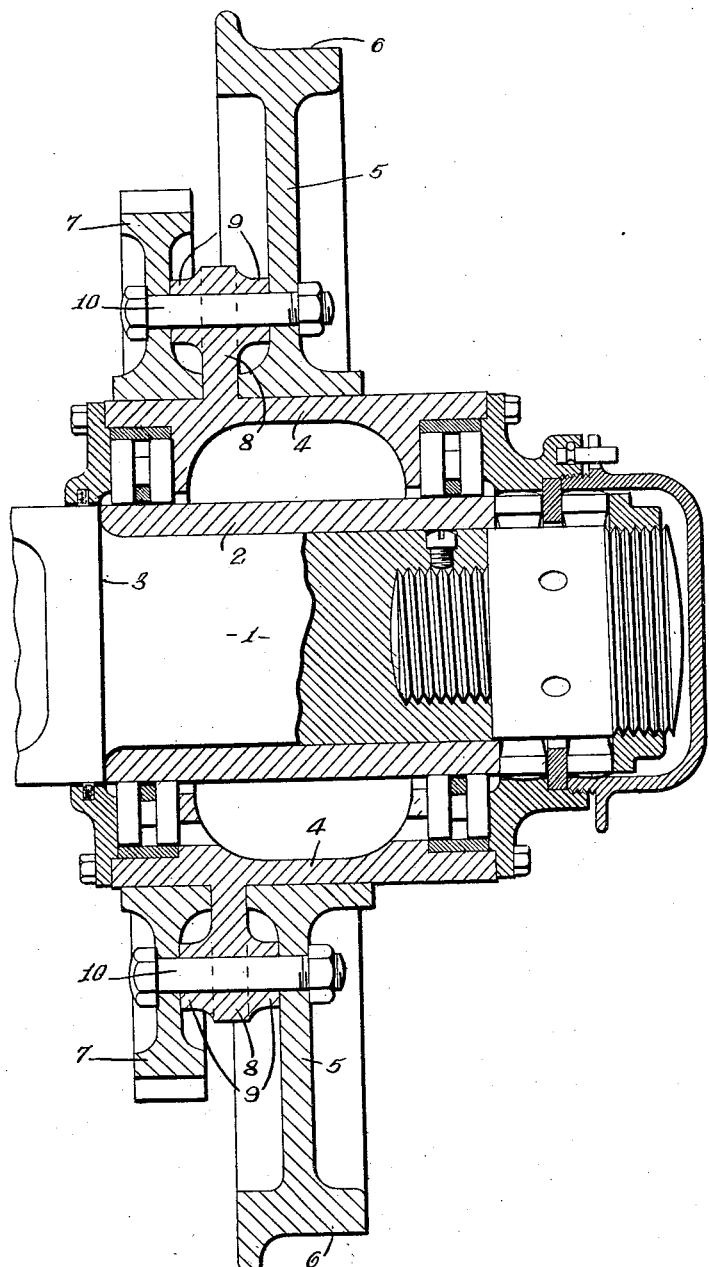
WITNESSES:
INVENTOR
James N Vandegrift
BY
Parsons Hall Bodell
ATTORNEYS

UNITED STATES PATENT OFFICE.

JAMES N. VANDEGRIFT, OF SYRACUSE, NEW YORK, ASSIGNOR TO RAILWAY ROLLER BEARING COMPANY, OF SYRACUSE, NEW YORK, A CORPORATION OF NEW YORK.

CAR-WHEEL.

1,071,000.  Specification of Letters Patent. Patented Aug. 19, 1913.

Application filed December 27, 1910. Serial No. 599,275.

*To all whom it may concern:*

Be it known that I, JAMES N. VANDEGRIFT, of Syracuse, in the county of Onondaga and State of New York, have invented a certain new and useful Car-Wheel, of which the following is a specification.

This invention has for its object the production of a particularly simple and efficient car wheel and it consists in the combinations and constructions hereinafter set forth and claimed.

In describing this invention reference is had to the accompanying drawing which is a vertical sectional view of my car wheel, the contiguous portion of the axle being also shown.

This car wheel comprises a hub for encircling the axle, a web mounted on the hub and separable therefrom, a tread carried by the web, a driving gear mounted on the hub, and means for securing the driving gear and web to the hub.

1 is the axle, said axle preferably having a sleeve 2 thereon; the inner end of the sleeve abutting against a shoulder 3 on the axle.

4 is the hub of the wheel, the hub 4 encircling the axle 1 and the sleeve 2 thereon, and constituting a journal box or holder for antifriction bearings.

5 is the web of the wheel, such web being separable from the hub.

6 is the flanged tread carried by the web; and 7 is the driving gear mounted on the hub and detachable therefrom.

The hub 4 is formed with a circumferential peripheral flange 8 and the web 5 and gear 7 are mounted on opposite sides of such flange and are secured to the hub in order to rotate therewith by fastening means extending transversely through such web 5, flange 8 and gear 7. As here shown the flange 8 is formed with series of bosses 9 projecting from opposite sides thereof toward the web 5 and gear 7 respectively, and abutting against opposing faces thereof, and bolts 10 are passed transversely through the gear 7, flange 8 and bosses 9 thereof, and the web 5.

Suitable antifriction and thrust bearings are shown as interposed between my improved car wheel and the axle 1, but these bearings are not described, as they form no part of the present invention.

What I claim is:

1. The combination with an axle, of a wheel comprising a hub encircling the axle and formed with a peripheral flange, a web mounted on the hub on one side of the flange and separable therefrom, a tread supported by the web, and a driving gear mounted on the hub on the other side of the flange, substantially as and for the purpose specified.

2. The combination with an axle, of a wheel comprising a hub inclosing the axle and formed with a peripheral flange, a web mounted on the hub on one side of the flange and separable therefrom, a tread supported by the web, a driving gear mounted on the hub on the other side of the flange, and fastening means extending transversely through the driving gear, flange and web, substantially as and for the purpose described.

3. The combination with an axle, of a wheel comprising a hub inclosing the axle and formed with a peripheral flange, a web mounted on the hub on one side of the flange and separable therefrom, a tread supported by the web, the flange having two series of bosses projecting in opposite directions therefrom, one series of bosses coacting with the web, a driving gear mounted on the hub on the other side of the flange and abutting against the ends of the other series of bosses, and fastening means extending transversely through the driving gear, the flange and bosses thereof and the web of the wheel, substantially as and for the purpose specified.

In testimony whereof, I have hereunto signed my name in the presence of two attesting witnesses, at Syracuse, in the county of Onondaga, in the State of New York, this 6th day of December, 1910.

JAMES N. VANDEGRIFT.

Witnesses:
S. DAVIS,
G. B. SMITH.